(12) United States Patent
Cropper et al.

(10) Patent No.: US 9,372,705 B2
(45) Date of Patent: *Jun. 21, 2016

(54) SELECTING A HOST FOR A VIRTUAL MACHINE USING A HARDWARE MULTITHREADING PARAMETER

(71) Applicant: International Business Machines Corporation, Armonk, NY (US)

(72) Inventors: Joseph W. Cropper, Rochester, MN (US); Kyle L. Henderson, Mantorville, MN (US); Jeffrey W. Tenner, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/305,703

(22) Filed: Jun. 16, 2014

(65) Prior Publication Data

US 2015/0355926 A1 Dec. 10, 2015

Related U.S. Application Data

(63) Continuation of application No. 14/297,677, filed on Jun. 6, 2014.

(51) Int. Cl.
  *G06F 9/455* (2006.01)
  *G06F 9/50* (2006.01)

(52) U.S. Cl.
  CPC ........ *G06F 9/45533* (2013.01); *G06F 9/45558* (2013.01); *G06F 9/5005* (2013.01); *G06F 2009/4557* (2013.01)

(58) Field of Classification Search
  CPC ........................... G06F 9/45533; G06F 9/5005

USPC ............................................................ 718/1
See application file for complete search history.

(56) References Cited

U.S. PATENT DOCUMENTS 8,280,790 B2 10/2012 Lappas et al.
8,850,442 B2 * 9/2014 Davis et al. .................. 718/104

(Continued)

FOREIGN PATENT DOCUMENTS

EP     2645236 A2   2/2013
EP     2660714 A2   6/2013
JP     2013186654 A 9/2013

OTHER PUBLICATIONS

Intel® Hyper-Threading Technology, Jul. 28, 2011, last retrieved from http://www.intel.com/content/www/us/en/architecture-and-technology/hyper-threading/hyper-threading-technology.html on Aug. 5, 2015.*

(Continued)

*Primary Examiner* — Qing Chen
*Assistant Examiner* — Andrew M Lyons
(74) *Attorney, Agent, or Firm* — Martin & Associates, LLC; Derek P. Martin

(57) ABSTRACT

A cloud manager monitors available resources on host computer systems, including a number of hardware threads supported by CPUs on the host computer systems. The cloud manager receives a request to provision a virtual machine (VM) that includes a hardware multithreading parameter that specifies the amount of hardware multithreading required on the host computer system. The cloud manager then selects a host computer system for the VM taking the hardware multithreading parameter into consideration.

8 Claims, 12 Drawing Sheets

(56) References Cited

U.S. PATENT DOCUMENTS

Figure 1:
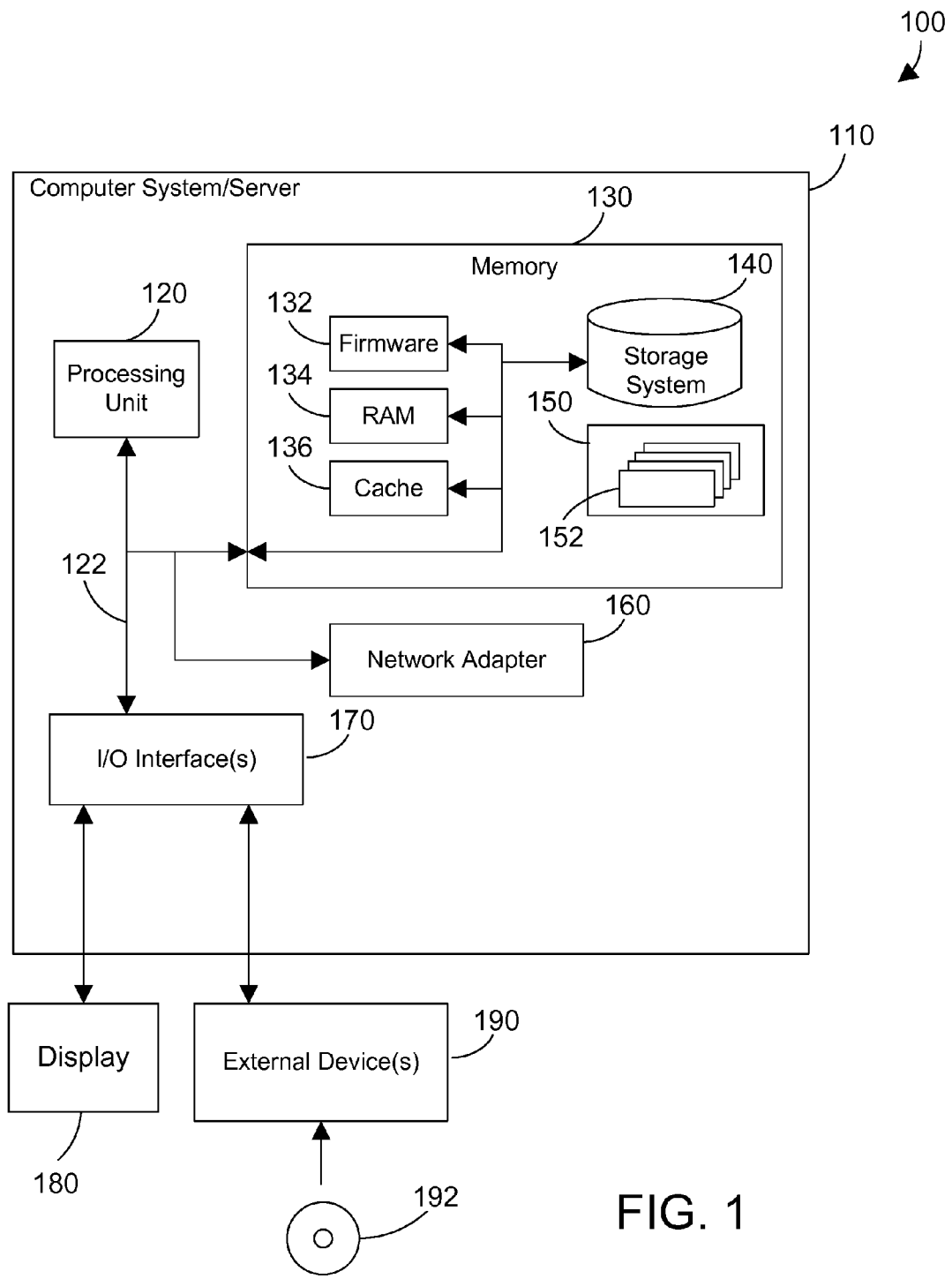

| | | | |
|---|---|---|---|
| 8,880,657 | B1 | 11/2014 | Angrish et al. |
| 8,949,659 | B2 | 2/2015 | Sainath |
| 2004/0268347 | A1 | 12/2004 | Knauerhase et al. |
| 2006/0136653 | A1 | 6/2006 | Traut et al. |
| 2009/0055834 | A1* | 2/2009 | Ding .................. G06F 9/5077 718/104 |
| 2010/0070970 | A1* | 3/2010 | Hu et al. .................. 718/1 |
| 2010/0138828 | A1* | 6/2010 | Hanquez ......... G06F 9/45533 718/1 |
| 2010/0186010 | A1* | 7/2010 | Chalemin ......... G06F 9/5077 718/1 |
| 2011/0179132 | A1* | 7/2011 | Mayo et al. .................. 709/213 |
| 2011/0179162 | A1 | 7/2011 | Mayo et al. |
| 2013/0031559 | A1 | 1/2013 | Alicherry |
| 2013/0297964 | A1* | 11/2013 | Hegdal et al. .................. 714/2 |
| 2014/0007097 | A1* | 1/2014 | Chin et al. .................. 718/1 |
| 2014/0019961 | A1* | 1/2014 | Neuse et al. .................. 718/1 |
| 2014/0019966 | A1* | 1/2014 | Neuse et al. .................. 718/1 |
| 2014/0047079 | A1 | 2/2014 | Breternitz et al. |
| 2014/0047084 | A1 | 2/2014 | Breternitz et al. |
| 2014/0047095 | A1 | 2/2014 | Breternitz et al. |
| 2014/0047227 | A1 | 2/2014 | Breternitz et al. |
| 2014/0047272 | A1 | 2/2014 | Breternitz et al. |
| 2014/0047341 | A1 | 2/2014 | Breternitz et al. |
| 2014/0047342 | A1 | 2/2014 | Breternitz et al. |
| 2014/0282520 | A1* | 9/2014 | Sabharwal .................. 718/1 |
| 2015/0007187 | A1 | 1/2015 | Shows |
| 2015/0169347 | A1 | 6/2015 | Anand et al. |
| 2015/0242226 | A1 | 8/2015 | Palavalli et al. |

OTHER PUBLICATIONS

Jsavit-Oracle, "Best Practices—Top Ten Tuning Tips," Feb. 4, 2013, last retrieved from https://blogs.oracle.com/jsavit/entry/best_practices_top_ten_tuning on Aug. 6, 2015.*

Microsoft, "SQL Server support in a hyper-threaded environment," Jan. 18, 2013, last retrieved from https://support.microsoft.com/en-us/kb/322385 on Aug. 5, 2015.*

Peschka, Jeremiah, "Five SQL Server Settings to Change," Sep. 4, 2013, last retrieved from http://www.brentozar.com/archive/2013/09/five-sql-server-settings-to-change/ on Aug. 5, 2015.*

Siron, Eric, "Hyper-V Virtual CPUs Explained," Feb. 7, 2014, last retrieved from http://www.altaro.com/hyper-v/hyper-v-virtual-cpus-explained/ on Aug. 5, 2015.*

Stack Exchange—Database Administrators, "What are the best practices for running SQL Server in a virtual machine?" Mar. 3, 2011, last retrieved from http://dba.stackexchange.com/questions/1554/what-are-the-best-practices-for-running-sql-server-in-a-virtual-machine on Aug. 5, 2015.*

Wahl, Chris, "Hyper-Threading Gotcha with Virtual Machine vCPU Sizing," Sep. 30, 2013, last retrieved from http://wahlnetwork.com/2013/09/30/hyper-threading-gotcha-virtual-machine-vcpu-sizing/ on Aug. 5, 2015.*

Cloudstack Service Offerings, https://github.com/apache/cloudstack-docs-admin/blob/master/source/service_offerings.rst, printed May 30, 2014.

Read, Jason, "What is an ECU? CPU Benchmarking in the Cloud", http://blog.cloudharmony.com/2010/05/what-is-ecu-cpu-benchmarking-in-cloud.html, May 29, 2010.

vSphere Documentation Center, "Creating Virtual Machines and Virtual Machine Templates", http://pubs.vmware.com/vsphere-50/index.jsp?topic=%2Fcom.vmware.wssdk.pg.doc_50%2FPG_Ch10_VM_Config.12.3.html, printed May 30, 2014.

VMWare Reference Guide, "Data Object—VirtualMachineConfigSpec", https://www.vmware.com/support/developer/vc-sdk/visdk2xpubs/ReferenceGuide/vim.vm.ConfigSpec.html, printed May 30, 2014.

VMWare Knowledge Base, "Setting the number of cores per CPU in a virtual machine", http://kb.vmware.com/selfservice/microsites/search.do?language=en_US&cmd=displayKC&externalId=1010184, printed May 30, 2014.

Jsavit-Oracle, "Best Practices—Core Allocation," Jun. 9, 2012, last retrieved from https://blogs.oracle.com/jsavit/entry/best_practices_core_allocation on Aug. 20, 2015.

Cropper et al., "Selecting a Host for a Virtual Machine Using a Hardware Multithreading Parameter" U.S. Appl. No. 14/297,677, filed Jun. 6, 2014.

Cropper et al., "Placement of Virtual CPUs Using a Hardware Multithreading Parameter" U.S. Appl. No. 14/297,707, filed Jun. 6, 2014.

Cropper et al., "Placement of Virtual CPUs Using a Hardware Multithreading Parameter" U.S. Appl. No. 14/305,853, filed Jun. 16, 2014.

Cropper et al., "Provisioning Virtual CPUs Using a Hardware Multithreading Parameter in Hosts With Split Core Processors" U.S. Appl. No. 14/297,724, filed Jun. 6, 2014.

Cropper et al., "Provisioning Virtual CPUs Using a Hardware Multithreading Parameter in Hosts With Split Core Processors" U.S. Appl. No. 14/305,955, filed Jun. 16, 2014.

List of IBM Patents or Patent Applications Treated As Related.

International Search Report and Written Opinion of the ISA dated Sep. 8, 2015—International Application No. PCT/IB2015/054229.

* cited by examiner

| max_guest_smt | Maximum SMT Setting Supported by Host <u>Possible Values</u> 0 (SMT_OFF), power of 2 number |
|---|---|

FIG. 26

| powerkvm:smt | Desired SMT value of guest VM. <u>Possible Values</u> -1 (don't care), 0 (SMT_OFF), power of 2 number |
|---|---|

FIG. 27

SELECTING A HOST FOR A VIRTUAL MACHINE USING A HARDWARE MULTITHREADING PARAMETER

BACKGROUND

1. Technical Field

This disclosure generally relates to deploying virtual machines to host computer systems, and more specifically relates to selecting a host for a virtual machine using a hardware multithreading parameter.

2. Background Art

In a cloud environment, a cloud manager deploys virtual machines to host computer systems to create virtual servers. Typically the cloud manager receives a request that specifies what the virtual machine image requires for system resources, such as memory, disk and CPU. The cloud manager then determines available host computer systems that have the required system resources, selects one of the available host computers systems, and deploys the virtual machine to the selected host computer system.

OpenStack is open-source software for building private and public clouds. In OpenStack, virtual hardware templates called "flavors" specify system resources needed for virtual machines. For example, a flavor in OpenStack can specify size of memory, root disk size, and number of virtual CPUs for a virtual machine. When a virtual machine needs to be deployed, a call is made to the cloud manager with the flavor specifying the needed resources for the virtual machine. The cloud manager then finds one or more host computer systems that has the resources specified in the flavor, and deploys the virtual machine on one of the host computer systems that satisfies the flavor.

Hardware multithreading in a host can complicate the provisioning of virtual machines to a host computer system. In the prior art, if hyperthreading is enabled on the host computer system, the number of hardware threads are considered when selecting a host computer system for a virtual machine and virtual CPUs are allocated to hardware threads without regard to the physical cores. If hyperthreading is not enabled on the host computer system, only physical processor cores are considered when selecting a host computer system for a virtual machine, and virtual CPUs are allocated only to physical processor cores when a VM is provisioned on the selected host computer system. With modern processor architectures such as POWER that include many hardware threads in each core, the result is a very inefficient use of processing resources.

BRIEF SUMMARY

A cloud manager monitors available resources on host computer systems, including a number of hardware threads supported by CPUs on the host computer systems. The cloud manager receives a request to provision a virtual machine (VM) that includes a hardware multithreading parameter that specifies the amount of hardware multithreading required on the host computer system. The cloud manager then selects a host computer system for the VM taking the hardware multithreading parameter into consideration.

The foregoing and other features and advantages will be apparent from the following more particular description, as illustrated in the accompanying drawings.

BRIEF DESCRIPTION OF THE SEVERAL VIEWS OF THE DRAWING(S)

Figure 2:
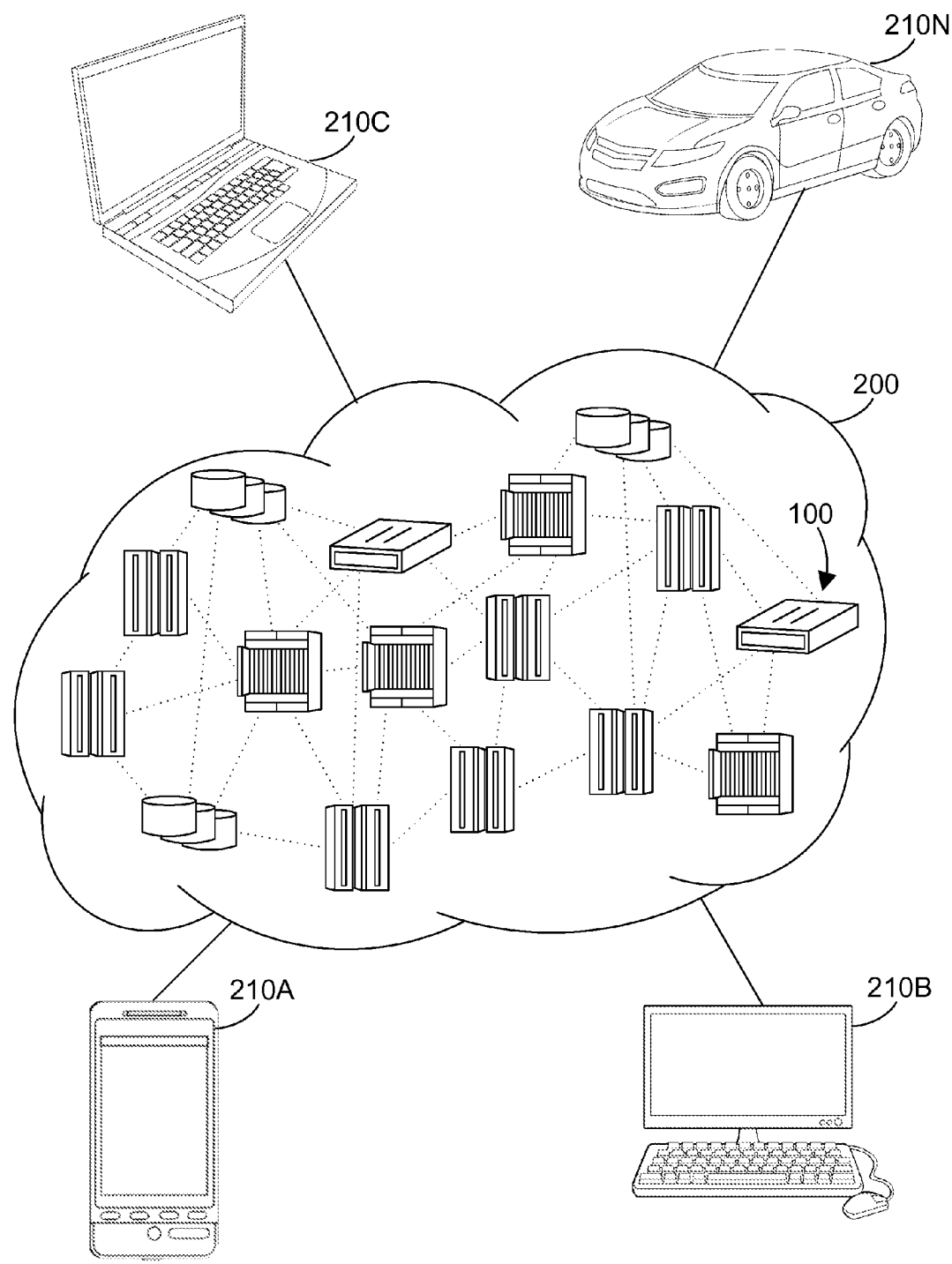
Figure 3:
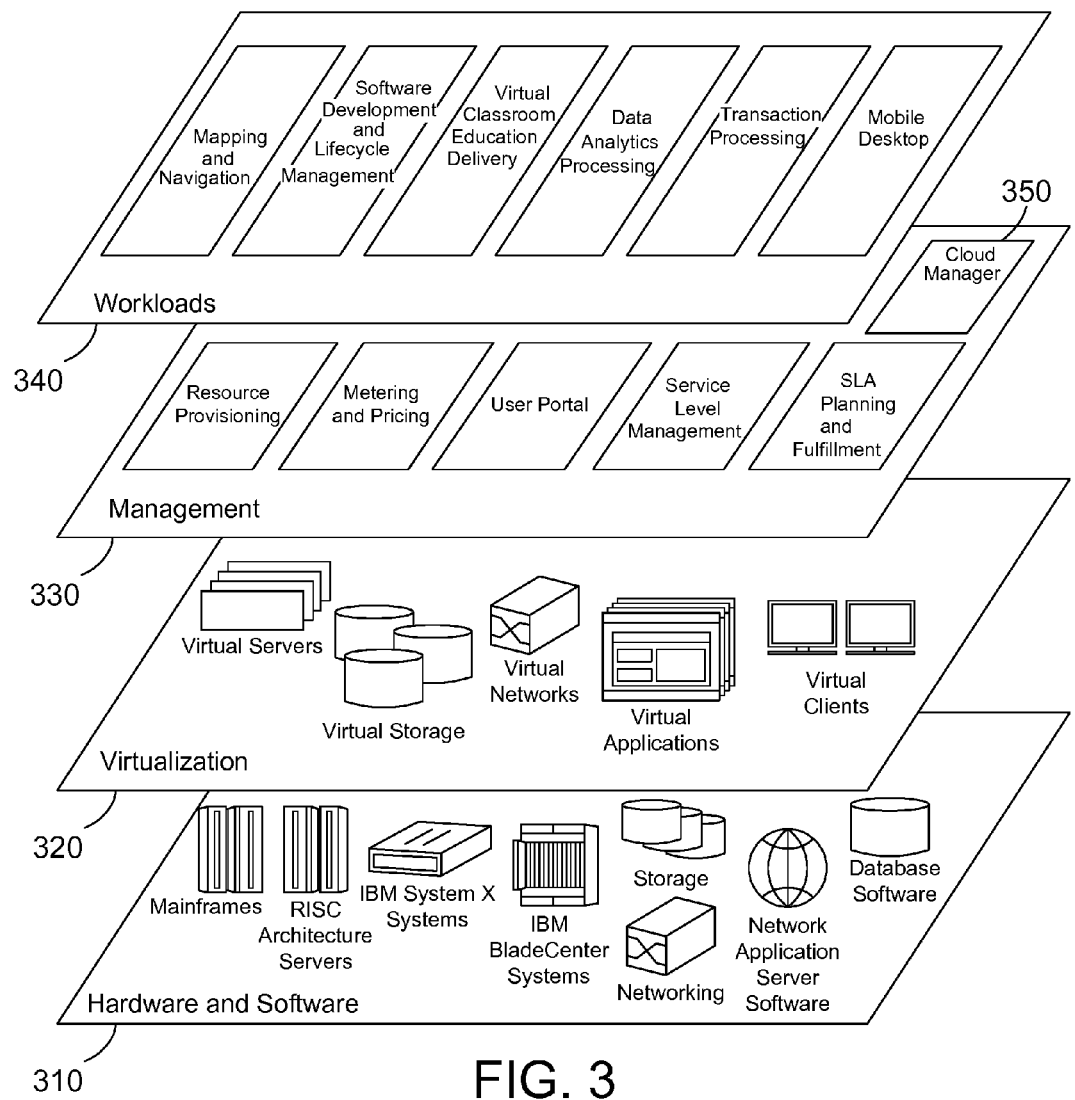
Figure 4:
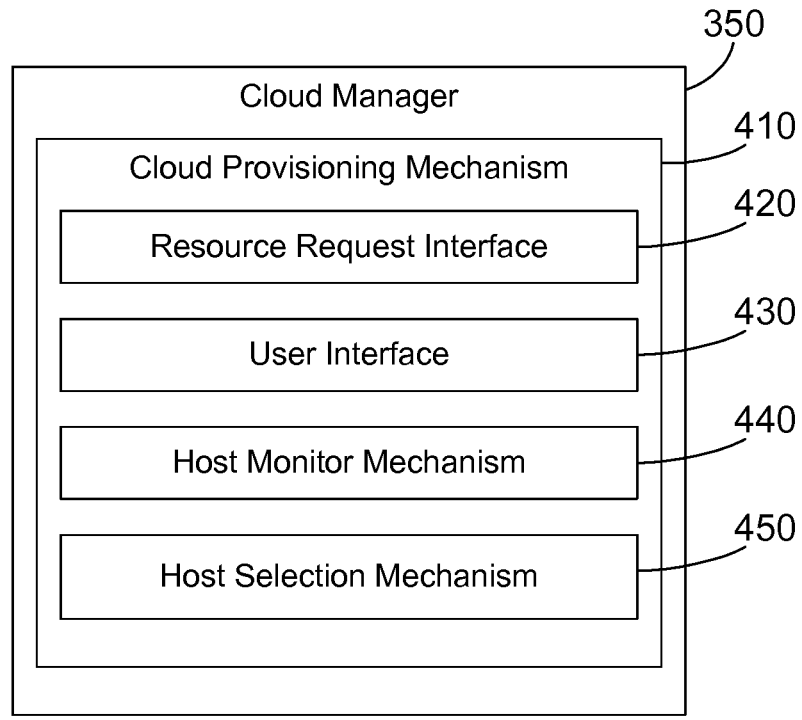
Figure 5:
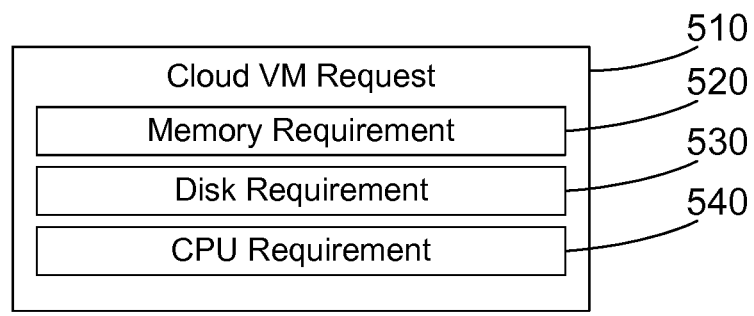
Figure 6:
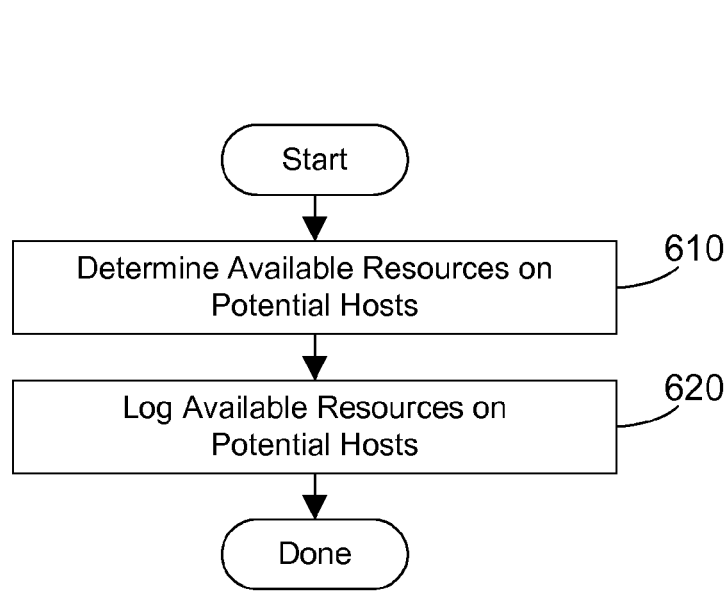
Figure 7:
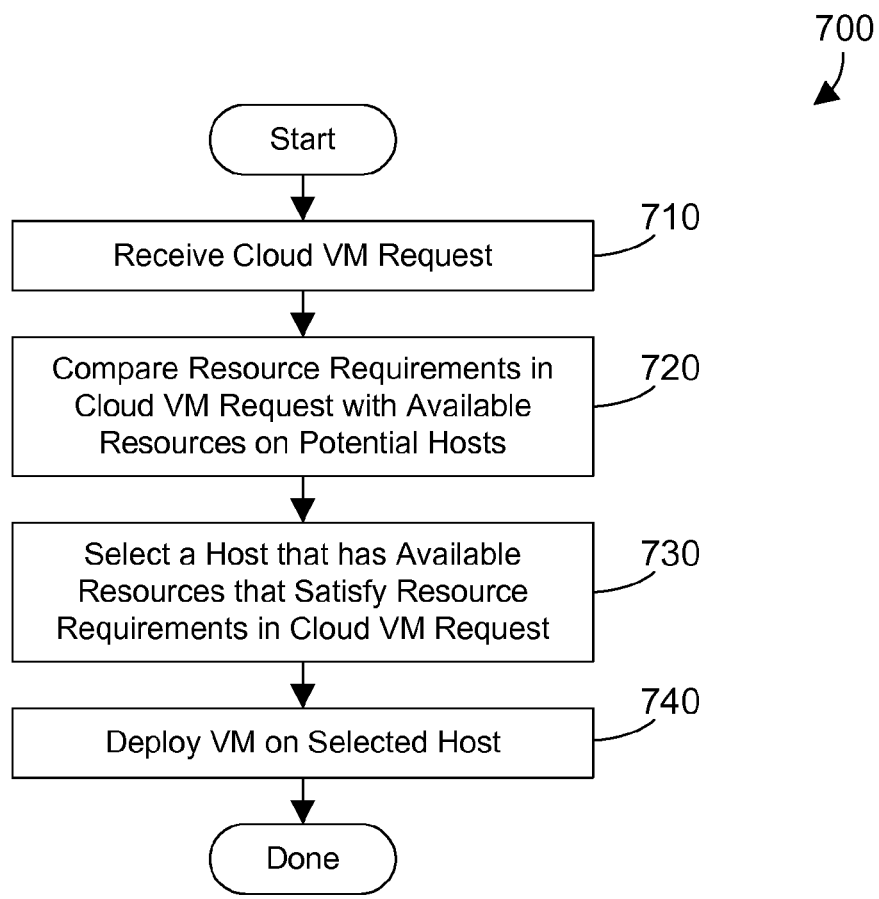
Figure 8:
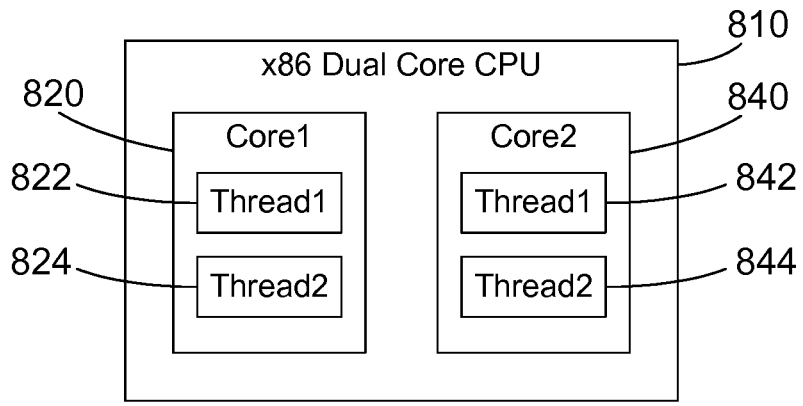
Figure 9:
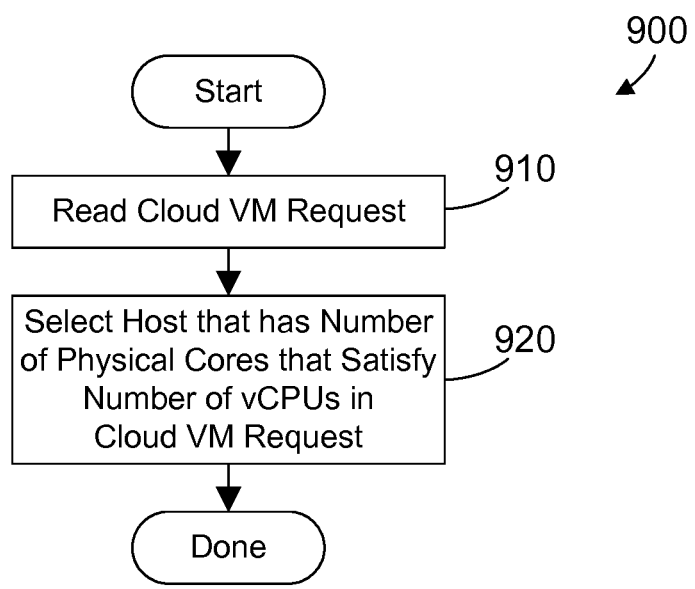
Figure 10:
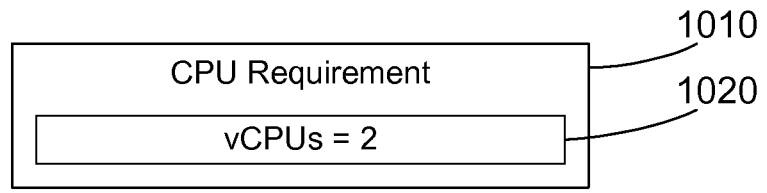
Figure 11:
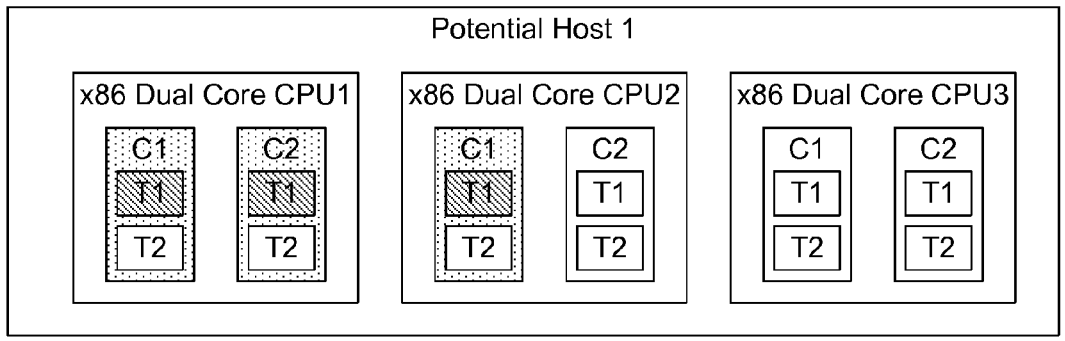
Figure 12:
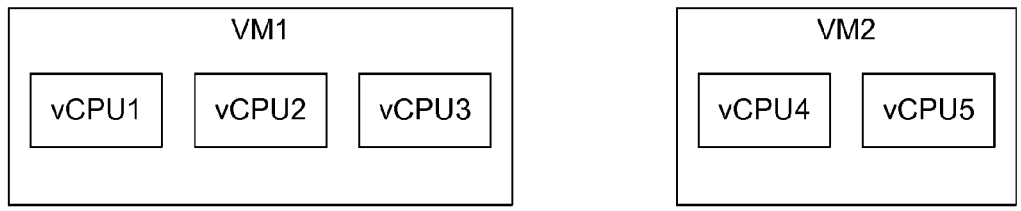
Figure 13:
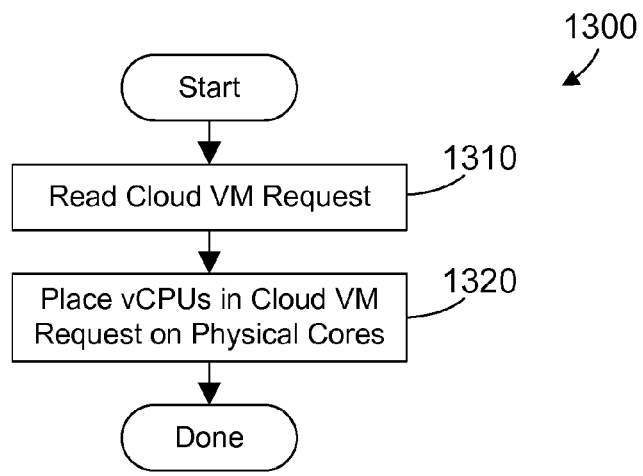
Figure 14:
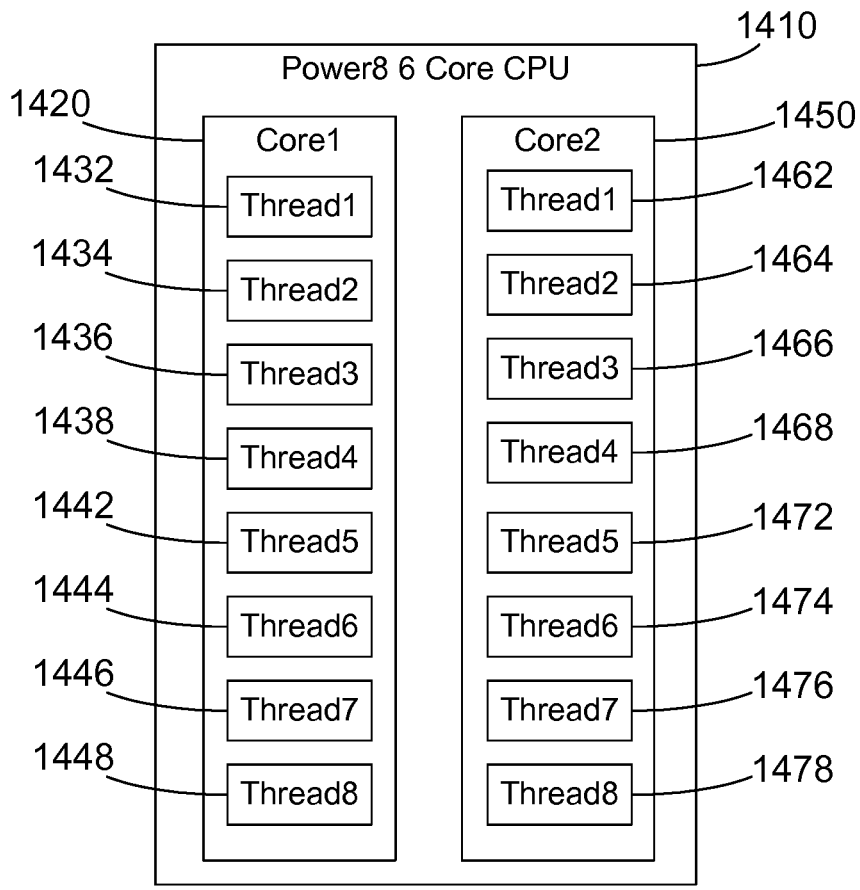
Figure 15:
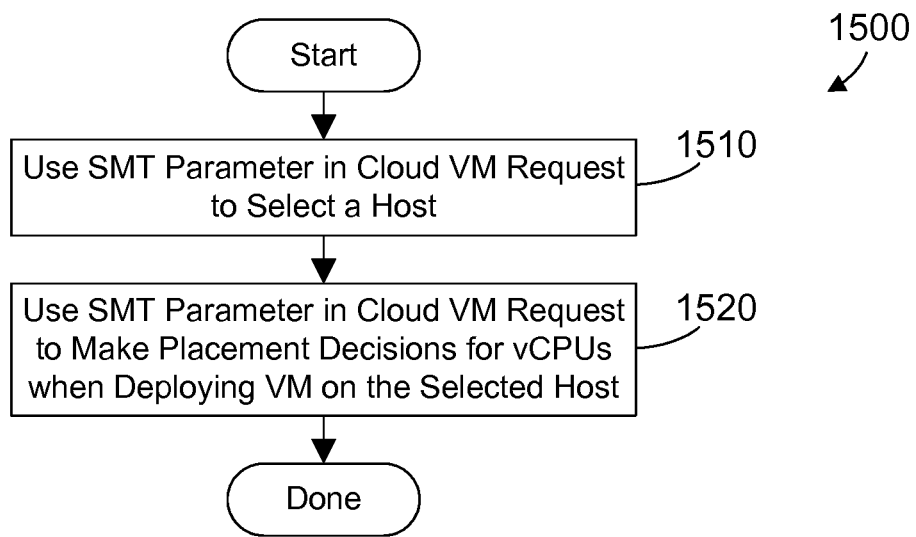
Figure 16:
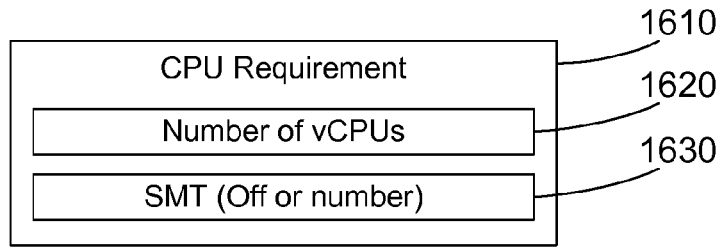
Figure 17:
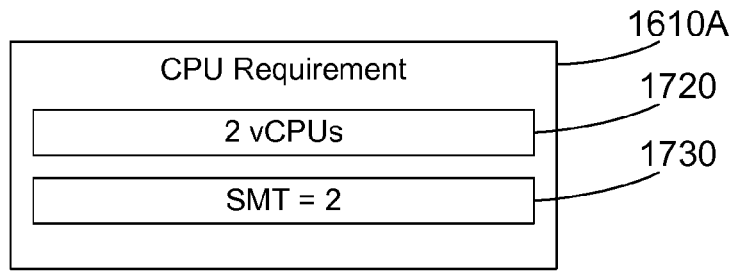
Figure 18:
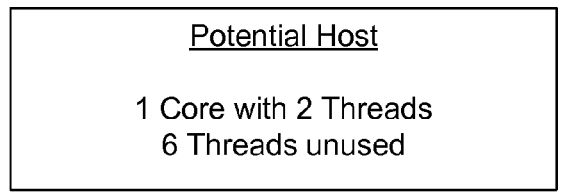
Figure 19:
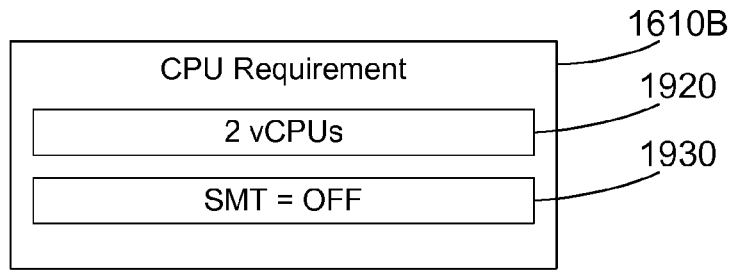
Figure 20:
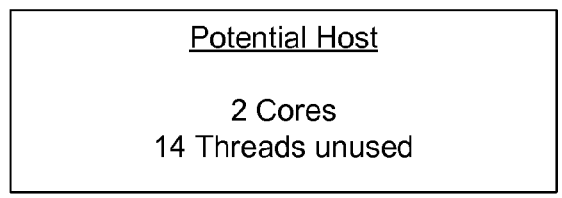
Figure 21:
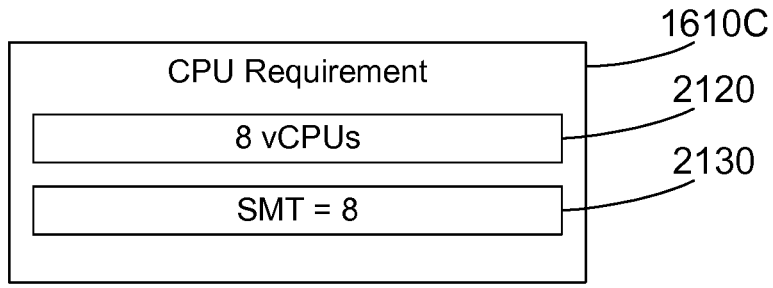
Figure 22:
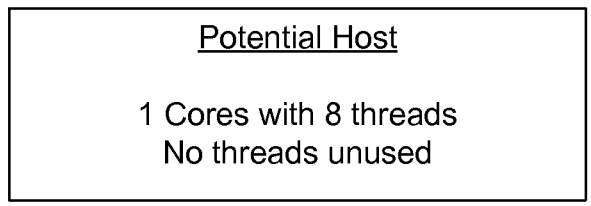
Figure 23:
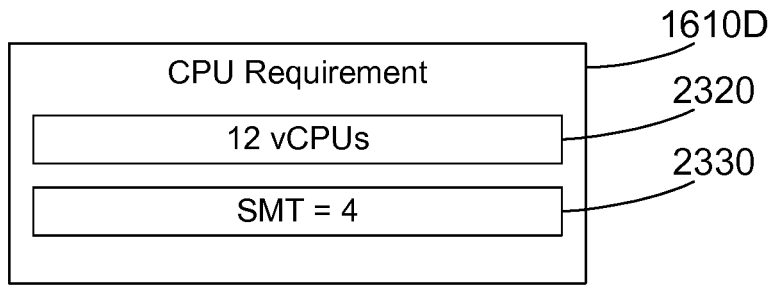
Figure 24:
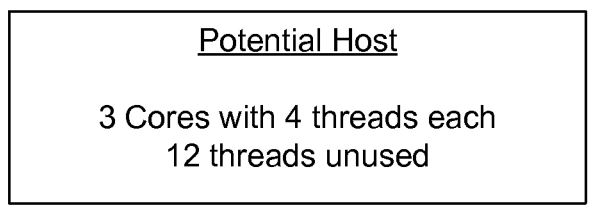
Figure 25:
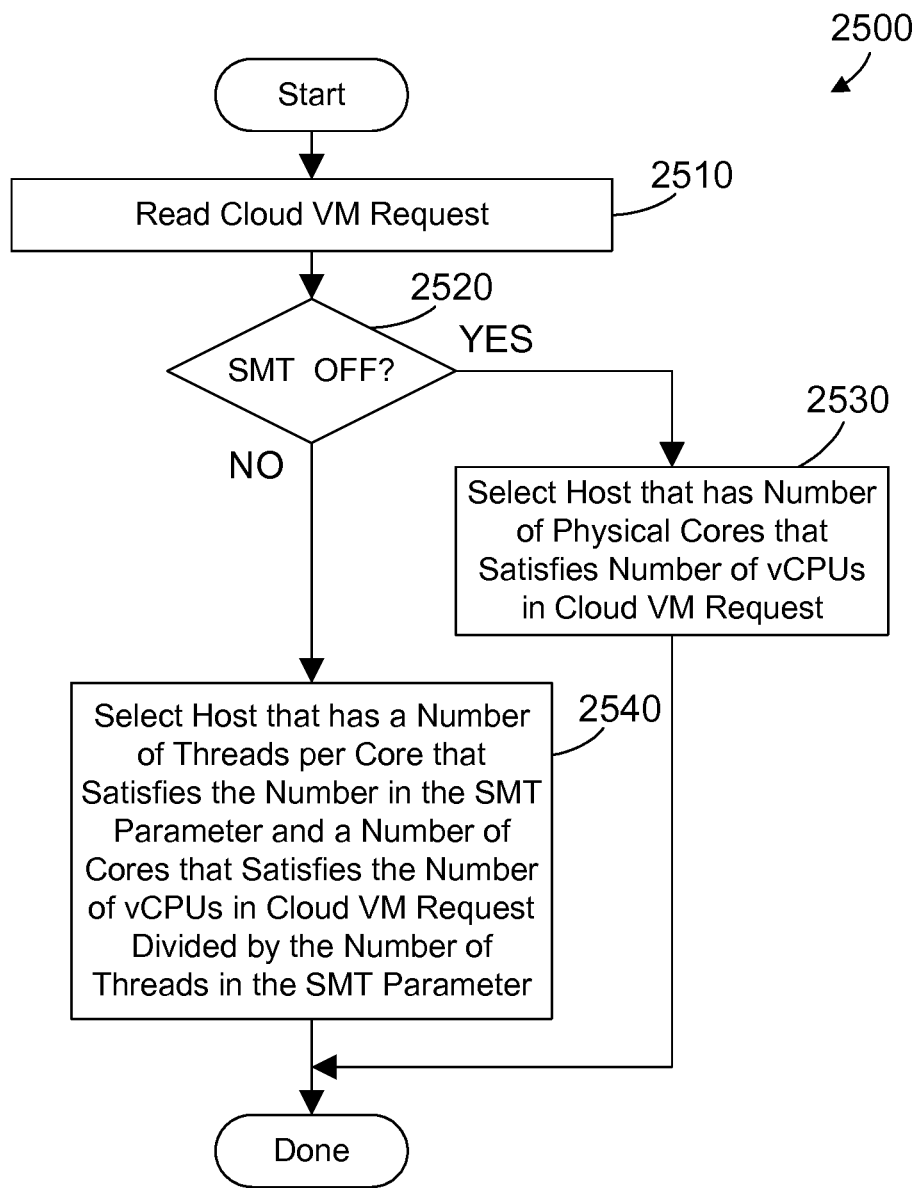

The disclosure will be described in conjunction with the appended drawings, where like designations denote like elements, and:

FIG. 1 is a block diagram of a cloud computing node;
FIG. 2 is a block diagram of a cloud computing environment;
FIG. 3 is a block diagram of abstraction model layers;
FIG. 4 is a block diagram showing some features of a cloud manager;
FIG. 5 is a block diagram showing some features of a cloud VM request;
FIG. 6 is a flow diagram of a method for a cloud manager to log available resources on potential host computer systems;
FIG. 7 is a flow diagram of a method for a cloud manager to provision a VM on a host computer system;
FIG. 8 is a block diagram of a prior art x86 dual core CPU;
FIG. 9 is a flow diagram of a prior art method for a cloud manager to select a host for a VM request;
FIG. 10 is a block diagram showing how CPU requirements are specified in a prior art cloud VM request;
FIG. 11 is a block diagram of a potential host computer system showing three x86 dual core processors;
FIG. 12 is a block diagram showing virtual machines that include vCPUs that can be allocated to the potential host in FIG. 11;
FIG. 13 is a flow diagram of a prior art method for placing vCPUs on physical cores in a host computer system;
FIG. 14 is a block diagram showing architecture of a Power8 6 core CPU;
FIG. 15 is a flow diagram of a method for using a hardware multithreading parameter to select a host and to control placement for vCPUs on the host;
FIG. 16 is a sample CPU requirement that includes number of vCPUs and a hardware multithreading parameter;
FIG. 17 is a first sample CPU requirement that includes a hardware multithreading parameter;
FIG. 18 shows a potential Power8 host that satisfies the CPU requirement in FIG. 17;
FIG. 19 shows a second sample CPU requirement that includes a hardware multithreading parameter;
FIG. 20 shows a potential Power8 host that satisfies the CPU requirement in FIG. 19;
FIG. 21 shows a third sample CPU requirement that includes a hardware multithreading parameter;
FIG. 22 shows a potential Power8 host that satisfies the CPU requirement in FIG. 21;
FIG. 23 shows a third sample CPU requirement that includes a hardware multithreading parameter;
FIG. 24 shows a potential Power8 host that satisfies the CPU requirement in FIG. 23;
FIG. 25 is a flow diagram of a method for selecting a host that satisfies a CPU requirement that includes a hardware multithreading parameter;
FIG. 26 is a block diagram showing a host-level statistic gathered for each potential host; and
FIG. 27 is a block diagram showing an extra specification that could be implemented in an OpenStack flavor to specify the hardware multithreading parameter.

DETAILED DESCRIPTION

A cloud manager monitors available resources on host computer systems, including a number of hardware threads supported by CPUs on the host computer systems. The cloud manager receives a request to provision a virtual machine (VM) that includes a hardware multithreading parameter that specifies the amount of hardware multithreading required on the host computer system. The cloud manager then selects a host computer system for the VM taking the hardware multithreading parameter into consideration.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may some-times be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 4 shows one suitable example of the cloud manager 350 shown in FIG. 3. The cloud manager 350 includes a cloud provisioning mechanism 410 that includes a resource request interface 420. The resource request interface 420 allows a software entity to request virtual machines from the cloud manager 350 without human intervention. The cloud manager 350 also includes a user interface 430 that allows a user to interact with the cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user.

The cloud manager 350 also includes a host monitor mechanism 440 that monitors resources available on potential host computer systems so the cloud manager 350 can compared specified resources for a VM with available resources on a potential host computer system. A host selection mechanism 450 allows selecting a potential host computer system based on comparing the specified resources for a requested VM with available resources on potential host computer systems.

FIG. 5 shows one suitable example of a cloud VM request 510 that could be submitted via the resource request interface 420 or via the user interface 430 on the cloud provisioning mechanism 410 in FIG. 4 to request a VM be provisioned by the cloud manager 350. Cloud VM request 510 can include any specification of requirements for needed resources on the VM. Examples of suitable requirements include memory requirement 520, disk requirement 530, and CPU requirement 540. The memory requirement 520 specifies the amount of memory needed for the VM. The disk requirement 530 specifies the amount of disk needed for the VM. The CPU requirement 540 specifies the number of virtual CPUs needed for the VM, and can also specify a hardware multithreading parameter, as discussed in more detail below. Of course, other requirements not shown in FIG. 5 could be specified for a VM, such as network requirement and any other suitable requirement. In the prior art, OpenStack uses something called a "flavor" as a cloud VM request, which specifies the minimum requirements for resources on a VM.

Referring to FIG. 6, a method 600 is preferably performed by the host monitor mechanism 440 in FIG. 4 to monitor available resources on potential host computer systems. Available resources on potential host computer systems are determined (step 610), and are logged (step 620). One known way to implement method 600 uses a driver that queries a host to determine its available resources.

Referring to FIG. 7, a method 700 begins by receiving a cloud VM request (step 710). The resource requirements in the cloud VM request are then compared with available resources on potential host computer systems (step 720). Note the available resources in step 720 could be read from the log created in step 620 in FIG. 6. A host is then selected that has resources that satisfy the resource requirements in the cloud VM request (step 730). The VM is then deployed on the selected host computer system (step 740).

Many modern processors (or CPUs) include multiple processing cores. One example of a multi-core processor is an x86 dual core CPU 810 shown in FIG. 8. The x86 dual core CPU 810 includes a first core 820 that has two hardware threads 822 and 824, and a second core 840 that has two hardware threads 842 and 844. The existence of multiple hardware threads on each core can create challenges in provisioning a VM to a host computer system. In the prior art, the number of hardware threads in a multi-core CPU is typically ignored, with only the physical cores being taken into consideration. For example, prior art method 900 in FIG. 9 reads the cloud VM request (step 910), then selects a host that hast a number of physical cores that satisfy the number of vCPUs in the cloud VM request (step 920). A prior art CPU requirement 1010 as shown in FIG. 10 specifies the number of virtual CPUs (vCPUs) in a VM, and is one suitable example for the CPU requirement 540 shown in FIG. 5. Because method 900 only uses physical cores when selecting a host for a VM, the multiple hardware threads on the cores will be underutilized, thereby not taking advantage of available CPU resources. In other prior art, when hyperthreading of the host is enabled, the number of hardware threads is taken into consideration and placement of vCPUs to hardware threads is performed without regard to physical cores. This approach can lead to inefficient VMs since some workloads benefit from leveraging threads on different cores while other are better served by threads for the same core.

Step 920 in FIG. 9 may include any suitable criteria or heuristic for selecting a host computer system that satisfies a VM request. For example, the number of physical cores could be increased by some overcommit ratio, such as 2.0. Thus, if a host has three physical cores available, multiplying the three physical cores by the 2.0 overcommit ratio will result in available processors of 6, which means a VM that requires six vCPUs could be deployed on the host but a VM that requires seven vCPUs could not. A simple example will illustrate.

FIG. 11 represents a sample potential host computer system that includes three dual core x86 CPUs. We assume this host already has VM1 shown in FIG. 12 running on it, which was deployed to the two physical cores in CPU1 and the first of the two physical cores in CPU2, as shown by the shading in those cores in FIG. 12. We further assume VM2 shown in FIG. 12 needs to be deployed. The number of available cores is determined, which for the example in FIG. 11 is nine, namely the six cores multiplied by the overcommit ratio of 2 minus the three cores used by VM1 in Potential Host 1 shown in FIG. 11. Because VM2 needs two vCPUs, and Potential Host 1 has 9 available cores, Potential Host 1 is a valid potential host for VM2 shown in FIG. 12.

Note the actual placement of vCPUs onto a potential host is a separate step from selecting the potential host for the VM. Referring to FIG. 13, method 1300 starts by reading the cloud VM request (step 1310). The vCPUs in the cloud VM request are then placed on physical cores (step 1320). In FIG. 11, thread T1 of the first and second cores of CPU1 and the first core of CPU2 are shaded to indicate the three vCPUs in VM1 shown in FIG. 12 have been placed on these three corresponding cores. Note, however, the placement is not static. At different times, a vCPU could be running on any of the hardware threads on any of the active cores. With hyperthreading, there are a total of twelve hardware threads in the three dual-cores allocated. VM1 would take 3 of these threads leaving 9 for other VMs. However, the vCPUs are allocated to any of the threads which may mean that work running in operating system threads that share memory would best be run in hardware threads of the same vCPU while work running in operating system threads that are independent are better run in hardware threads in different cores. Therefore, prior art creates inefficiencies in the way potential hosts are identified for a VM and in the way VMs run on a selected host because the allocation of VMs to potential hosts does not currently account for the differences between hardware threads and cores on CPUs.

The prior art recognizes either a physical processor core or a hardware thread but not both as the entity to which a virtual CPU can be deployed. Without hyperthreading, a single dual core CPU as shown in FIG. 8 has two available CPUs in the form of its two physical cores 820 and 840 to which vCPUs can be deployed. With hyperthreading, a single dual core CPU could support more vCPUs; however, whether the vCPUs are run by hardware threads on the same physical core or different cores is not deterministic. The disclosure and claims herein create a finer level of granularity, recognizing that vCPUs need to be allocated to multiple hardware threads, not just to a single physical core or a single hardware thread.

The problem of vCPUs being allocated to either a single hardware thread or core is exacerbated when the number of hardware threads is increased. For the x86 dual core CPUs shown in FIGS. 8 and 11, hyperthreading results in two threads per core. For processors with more hardware threads, the problem becomes more pronounced. For example, a Power8 6 Core CPU 1410 is shown in FIG. 14 to include a first core 1420 that includes eight hardware threads 1432, 1434, 1436, 1438, 1442, 1444, 1446 and 1448, and a second core 1450 that also includes eight hardware threads 1462, 1464, 1466, 1468, 1472, 1474, 1476 and 1478. The four other cores are not shown in FIG. 14, but are similar to the two cores shown. When a host is selected based on the number of physical cores as shown in prior art method 900 in FIG. 9, many of the hardware threads will be unused. Thus, if two vCPUs were deployed to the two cores 1420 and 1450 shown in FIG. 14, the result would be wasting seven of the eight hardware threads on each core. The net result is that only two of the sixteen threads will be used at any given point in time, which is a waste of fourteen of the sixteen hardware threads. This means that only two out of sixteen (12.5%) of the available processing resources on two of the Power8 cores can be utilized using the prior art method 900 shown in FIG. 9. Alternatively, if vCPUs are allocated to a hardware thread when there are many hardware threads per core, VMs with workloads that require a high degree of parallelism and shared memory will get better performance by being located on the same physical core as other vCPUs for that VM rather than spread across many physical cores.

To avoid the problem of so many unused threads or vCPUs spread across physical cores as described above with reference to FIG. 14, a new way to identify potential hosts and deploy VMs takes hardware threads into account using a hardware multithreading parameter in the cloud VM request based on the principle that a vCPU could be allocated to multiple hardware threads within a physical core instead of just a physical core or single hardware thread. This is done using a new parameter in the cloud VM request that relates to hardware multithreading. For the specific examples herein, this hardware multithreading parameter is referred to as an "SMT" parameter, which stands for Symmetric Multithreading, which is a known term in the art for describing hardware multithreading on CPUs. Referring to FIG. 15, method 1500 begins by using an SMT parameter in the cloud VM request to select a host computer system (step 1510). Once the host computer system has been selected, the same SMT parameter in the cloud VM request can be used to make placement decisions for vCPUs when deploying the VM on the selected host (step 1520).

FIG. 10 shows a prior art CPU requirement 1010 for a cloud VM request includes specifying the number of vCPUs 1020 needed on the VM. A cloud VM request 1610 shown in FIG. 16 in accordance with the disclosure and claims herein includes the number of vCPUs 1620, but additionally includes a hardware multithreading (SMT) parameter 1630. The value of the SMT parameter can be zero, indicating that hardware multithreading is turned off, or can be a power of 2 number representing the number of hardware threads. Some examples will illustrate. Referring to FIG. 17, a CPU requirement 1610A is one suitable example for the CPU requirement 1610 shown in FIG. 16, and includes 2 vCPUs 1720 and the SMT parameter with a value of two 1730. For a potential host that has a Power8 6 core CPU 1410 as shown in FIG. 14, the potential host will have one core with two threads used, resulting in six unused threads, as shown in FIG. 18.

A second CPU requirement 1610B in FIG. 19 is another suitable example for the CPU requirement 1610 shown in FIG. 16, and includes 2 vCPUs 1920 and the SMT parameter with a value at 1930 that indicates hardware multithreading is turned off. With hardware multithreading turned off, for a potential host that has a Power8 6 core CPU 1410 as shown in FIG. 14, the potential host will have two cores with one thread in each core used, resulting in fourteen unused threads in the two cores, as shown in FIG. 20. Note that the net result of the potential host for the CPU requirement 1610B in FIG. 19 with the SMT parameter turned off is the same as the prior art CPU requirement 1010 shown in FIG. 10, when hyperthreading is disabled because the prior art CPU requirement 1010 does not take into account any hardware multithreading when host hyperthreading is disabled. In prior art, if hyperthreading is enabled, it is not predictable which core's hardware threads would process the vCPU. By specifying a value for the hardware multithreading parameter that takes hardware multithreading into account, the number of unused hardware threads on a potential host can be reduced and which vCPUs are run on the same core can be controlled.

The examples in FIGS. 16-19 show how the hardware multithreading parameter gives more control over how vCPUs are deployed. For example, if a VM with 2 vCPUs will run jobs that operate on the same data, it may be desirable for the 2 vCPUs to be deployed to two different hardware threads in the same core, as shown in the example in FIGS. 17 and 18, because the two threads running on the same core will have very high-performance access to cache memory available to the core. If a VM with 2 vCPUs will run jobs that are independent of each other, it may be desirable for the 2 vCPUs to be deployed to two different cores, as shown in the example in FIGS. 19 and 20.

A third CPU requirement 1610C in FIG. 21 is another suitable example for the CPU requirement 1610 shown in FIG. 16, and includes 8 vCPUs 2120 and the SMT parameter with a value of 8 at 2130. For a potential host that has a Power8 6 core CPU 1410 as shown in FIG. 14, the potential host will have one core with all eight threads used, resulting in no unused threads, as shown in FIG. 22.

A fourth CPU requirement 1610D in FIG. 23 is another suitable example for the CPU requirement 1610 shown in FIG. 16, and includes 12 vCPUs 2320 and the SMT parameter with a value of 4 at 2330. For a potential host that has a Power8 6 core CPU 1410 as shown in FIG. 14, the potential host will have three cores with four threads used in each core, resulting in twelve unused threads, as shown in FIG. 24. These simple examples show how specifying a hardware multithreading parameter in selecting a host computer system provides control over how the vCPUs are deployed to the host computer system.

Note the examples shown in FIGS. 17-24 assume a vCPU can be deployed to each available thread. The discussion above with respect to FIGS. 9-12 discusses an "overcommit ratio" to increase the number of CPUs by some amount. A similar overcommit ratio could be applied in selecting a host computer system in accordance with the disclosure and claims herein.

Referring to FIG. 25, a method 2500 selects a host when a hardware multithreading parameter is specified, as shown in FIGS. 16, 17, 19, 21 and 23. The cloud VM request is read (step 2510). When the SMT parameter is OFF (step 2520=YES), a host that has a number of physical cores that satisfies the number of vCPUs in the cloud VM request is selected (step 2530). Note that step 2530 is similar to step 920 in prior art method 900 in FIG. 9. When the SMT parameter is ON (step 2520=NO), a host is selected that has a number of threads per core that satisfies the number in the SMT parameter and a number of cores that satisfies the number of vCPUs in the cloud VM request divided by the number of threads specified in the SMT parameter (step 2540). This is one specific way to select a host that has a number of hardware threads that satisfies the number of vCPUs in the cloud VM request. Method 2500 is then done.

With a hardware multithreading parameter in the cloud VM request, the cloud manager must know not only the number of physical cores in CPUs in a potential host, but must also know the number of threads supported by the CPUs in the potential host. This is to ensure that a single core of the host can support the number of threads specified for the cloud VM request. Referring again to FIG. 6, this means determining the available resources in step 610 not only includes determining available CPU cores, but whether multiple threads on these CPU cores are available as well. One way to accomplish this is to collect as part of the available resources in step 610 in FIG. 6 the maximum SMT setting supported by the host computer system. One example of this is shown in FIG. 26, where max_guest_smt represents a value gathered by the host monitor mechanism 440 in FIG. 4 to indicate whether a potential host computer system supports hardware multithreading or not. The possible values of the max_guest_smt are zero, which indicates SMT is turned off on the host computer system, and power of 2 number which indicates the number of hardware threads available on each CPU. When all of the CPUs in a host computer system are of the same type, the max_guest_smt will be a single value that applies to all of the CPUs in the host computer system. When the host computer system includes CPUs of different types that include different numbers of hardware threads, there could be a different max_guest_smt value for each CPU in the host computer system.

OpenStack currently does not have any existing support to help specify the desired topology of the guest CPU. One way to implement the addition of a hardware multithreading parameter discussed herein is to add an additional specification to an OpenStack flavor as shown in FIG. 27. A parameter powerkvm:smt is a new parameter in an OpenStack flavor that specifies a desired SMT value for a guest VM. Note the possible values of this parameter are −1, indicating "don't care"; zero, which indicates that SMT is off; or some power of 2 number. By including the ability to gather information regarding hardware multithreading on potential hosts in the max_guest_smt setting, and the ability to specify a desired level of hardware multithreading in the OpenStack flavor, the disclosure and claims herein provide a much improved way to select potential host computer systems on which to deploy VMs and to deploy those VMs in a way that takes better advantage of the hardware multithreading capabilities of the host computer systems, thereby improving utilization of CPU resources on the host computer systems.

A cloud manager monitors available resources on host computer systems, including a number of hardware threads supported by CPUs on the host computer systems. The cloud manager receives a request to provision a virtual machine (VM) that includes a hardware multithreading parameter that specifies the amount of hardware multithreading required on the host computer system. The cloud manager then selects a host computer system for the VM taking the hardware multithreading parameter into consideration.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a cloud manager residing in the memory and executed by the at least one processor, the cloud manager comprising:
      a host monitor mechanism that determines number of CPUs available on a plurality of host computer systems to which virtual machines could be deployed and that further determines number of hardware threads supported by each CPU on the plurality of host computer systems; and
      a host selection mechanism that receives a virtual machine (VM) request that includes a number of virtual CPUs and a hardware multithreading parameter that specifies whether hardware multithreading is required, and when hardware multithreading is required, specifies a minimum number of hardware threads per core, wherein the host selection mechanism selects one of the plurality of host computer systems that satisfies the hardware multithreading parameter and that includes a number of CPUs with a number of hardware threads that satisfies the number of virtual CPUs in the VM request.

2. The apparatus of claim 1 wherein a first value of the hardware multithreading parameter indicates hardware multithreading is turned off and is therefore not required on the selected host computer system.

3. The apparatus of claim 1 wherein a second value of the hardware multithreading parameter indicates hardware multithreading is required on the selected host computer system with a numerical value for the minimum number of hardware threads per core on the selected host computer system.

4. The apparatus of claim 1 wherein a third value of the hardware multithreading parameter indicates the selected host computer system is selected without regard to whether hardware threading is turned on or off on the selected host computer system.

5. The apparatus of claim 1 wherein the VM request further includes a memory requirement and a disk requirement.

6. The apparatus of claim 1 wherein the host monitor mechanism further determines amount of memory and amount of disk space on each of the plurality of host computer systems.

7. The apparatus of claim 1 wherein when the number of virtual CPUs in the VM request is greater than the value of the hardware multithreading parameter, the host selection mechanism selects the one of the plurality of host computer systems that includes a plurality of CPUs each having a plurality of hardware threads.

8. An apparatus comprising:
   at least one processor;
   a memory coupled to the at least one processor;
   a cloud manager residing in the memory and executed by the at least one processor, the cloud manager comprising:
      a host monitor mechanism that determines number of CPUs available on a plurality of host computer systems to which virtual machines could be deployed and that further determines number of hardware threads supported by each CPU on the plurality of host computer systems; and
      a host selection mechanism that receives a virtual machine (VM) request that includes:
         a memory requirement that specifies a minimum amount of memory for the VM;
         a disk requirement that specifies a minimum amount of disk for the VM; and
         a CPU requirement that specifies a number of virtual CPUs for the VM and a hardware multithreading parameter that specifies whether hardware multithreading is required on the host computer system, and when hardware multithreading is required, specifies a minimum number of hardware threads per core, wherein a first value of the hardware multithreading parameter indicates hardware multithreading is turned off, a second value of the hardware multithreading parameter indicates a numerical value for the minimum number of hardware threads per core, and a third value of the hardware multithreading parameter indicates the selected host computer system is selected without regard to whether hardware threading is turned on or off on the selected host computer system; and
      wherein the host selection mechanism selects one of the plurality of host computer systems that satisfies the hardware multithreading parameter and that includes a number of CPUs with a number of hardware threads that satisfies the number of virtual CPUs in the VM request.

* * * * *